(12) United States Patent
Jeh

(10) Patent No.: US 9,443,022 B2
(45) Date of Patent: Sep. 13, 2016

(54) METHOD, SYSTEM, AND GRAPHICAL USER INTERFACE FOR PROVIDING PERSONALIZED RECOMMENDATIONS OF POPULAR SEARCH QUERIES

(75) Inventor: Glen Jeh, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/354,280

(22) Filed: Jan. 19, 2012

(65) Prior Publication Data

US 2015/0161256 A1 Jun. 11, 2015

Related U.S. Application Data

(63) Continuation of application No. 11/447,575, filed on Jun. 5, 2006, now abandoned.

(51) Int. Cl.
*G06F 17/30* (2006.01)
*G06F 7/00* (2006.01)

(52) U.S. Cl.
CPC ... *G06F 17/30867* (2013.01); *G06F 17/30663* (2013.01); *G06F 17/30864* (2013.01)

(58) Field of Classification Search
None
See application file for complete search history.

(56) References Cited

U.S. PATENT DOCUMENTS

| | | |
|---|---|---|
| 5,724,567 A | 3/1998 | Rose et al. |
| 5,754,939 A | 5/1998 | Herz et al. |
| 6,038,574 A | 3/2000 | Pitkow et al. |
| 6,131,110 A | 10/2000 | Bates et al. |
| 6,175,824 B1 | 1/2001 | Breitzman et al. |
| 6,182,091 B1 | 1/2001 | Pitkow et al. |
| 6,202,058 B1 | 3/2001 | Rose et al. |
| 6,285,999 B1 | 9/2001 | Page |
| 6,349,307 B1 | 2/2002 | Chen |
| 6,356,922 B1 | 3/2002 | Schilit et al. |
| 6,381,594 B1 | 4/2002 | Eichstaedt et al. |
| 6,385,619 B1 | 5/2002 | Eichstaedt et al. |
| 6,411,950 B1 * | 6/2002 | Moricz et al. |
| 6,460,029 B1 | 10/2002 | Fries et al. |
| 6,510,424 B1 | 1/2003 | Ford et al. |
| 6,513,026 B1 | 1/2003 | Horvitz et al. |
| 6,549,941 B1 | 4/2003 | Jaquith et al. |
| 6,643,661 B2 | 11/2003 | Polizzi et al. |

(Continued)

FOREIGN PATENT DOCUMENTS

| | | |
|---|---|---|
| EP | 1 050 830 A2 | 8/2000 |
| WO | WO 02/37851 | 5/2002 |
| WO | WO 2005/033979 | 4/2005 |

OTHER PUBLICATIONS

Jeh, Office Action, U.S. Appl. No. 13/043,400, Jul. 13, 2012, 30 pgs.

(Continued)

*Primary Examiner* — Usmaan Saeed
*Assistant Examiner* — Yu Zhao
(74) *Attorney, Agent, or Firm* — Brake Hughes Bellermann LLP

(57) ABSTRACT

A method, system, and graphical user interface for providing personalized recommendations of popular search queries are disclosed. One aspect of the invention involves a graphical user interface on a computer that includes a plurality of queries recommended by a search engine for a computer user. The plurality of queries are determined by the search engine based on Internet usage data for the computer user and submission popularity data for search queries submitted by a plurality of users.

18 Claims, 7 Drawing Sheets

(56) References Cited

U.S. PATENT DOCUMENTS

| | | |
|---|---|---|
| 6,658,623 B1 | 12/2003 | Schilit et al. |
| 6,678,694 B1 | 1/2004 | Zimmermann et al. |
| 6,691,106 B1 | 2/2004 | Sathyanarayan |
| 6,745,193 B1 | 6/2004 | Horovitz et al. |
| 6,804,675 B1 | 10/2004 | Knight et al. |
| 6,853,982 B2 | 2/2005 | Smith et al. |
| 6,871,140 B1 | 3/2005 | Florance et al. |
| 6,873,990 B2 | 3/2005 | Oblinger |
| 6,912,505 B2 | 6/2005 | Linden et al. |
| 6,941,321 B2 | 9/2005 | Schuetze et al. |
| 6,981,040 B1 | 12/2005 | Konig et al. |
| 7,162,473 B2 | 1/2007 | Dumais et al. |
| 7,464,086 B2* | 12/2008 | Black et al. |
| 7,765,178 B1 | 7/2010 | Roizen et al. |
| 2002/0024532 A1 | 2/2002 | Fables et al. |
| 2002/0095621 A1 | 7/2002 | Lawton |
| 2002/0184095 A1 | 12/2002 | Scullard et al. |
| 2002/0198882 A1 | 12/2002 | Linden et al. |
| 2003/0014399 A1 | 1/2003 | Hansen et al. |
| 2003/0126136 A1 | 7/2003 | Omogui |
| 2003/0195877 A1 | 10/2003 | Ford et al. |
| 2003/0233345 A1 | 12/2003 | Perisic et al. |
| 2004/0044571 A1 | 3/2004 | Bronnimann et al. |
| 2004/0088286 A1 | 5/2004 | Hackleman et al. |
| 2004/0186827 A1 | 9/2004 | Anick et al. |
| 2004/0205516 A1 | 10/2004 | Tufts |
| 2004/0210661 A1 | 10/2004 | Thompson |
| 2004/0215608 A1 | 10/2004 | Gourlay |
| 2004/0236736 A1 | 11/2004 | Whitman et al. |
| 2004/0249808 A1 | 12/2004 | Azzam et al. |
| 2004/0260621 A1* | 12/2004 | Foster et al. .............. 705/26 |
| 2005/0027742 A1 | 2/2005 | Eichstaedt et al. |
| 2005/0033657 A1 | 2/2005 | Herrington et al. |
| 2005/0033803 A1 | 2/2005 | Vleet et al. |
| 2005/0060311 A1 | 3/2005 | Tong et al. |
| 2005/0071328 A1* | 3/2005 | Lawrence ................ 707/3 |
| 2005/0080786 A1 | 4/2005 | Fish et al. |
| 2005/0120003 A1 | 6/2005 | Drury et al. |
| 2005/0144067 A1 | 6/2005 | Farahat et al. |
| 2005/0278633 A1 | 12/2005 | Kemp |
| 2006/0026147 A1 | 2/2006 | Cone et al. |
| 2006/0212265 A1 | 9/2006 | Amitay et al. |
| 2006/0224587 A1* | 10/2006 | Zamir ............ G06F 17/30867 |
| 2006/0230035 A1 | 10/2006 | Bailey et al. |
| 2006/0248078 A1* | 11/2006 | Gross et al. .............. 707/5 |
| 2006/0259861 A1 | 11/2006 | Watson |
| 2007/0043706 A1 | 2/2007 | Burke et al. |
| 2007/0050339 A1* | 3/2007 | Kasperski et al. .......... 707/3 |
| 2007/0100798 A1 | 5/2007 | Kapur |
| 2007/0100836 A1 | 5/2007 | Eichstaedt et al. |
| 2007/0214115 A1* | 9/2007 | Liu et al. ................ 707/3 |
| 2007/0239680 A1 | 10/2007 | Oztekin et al. |
| 2007/0266025 A1* | 11/2007 | Wagner et al. ............ 707/7 |
| 2008/0005070 A1* | 1/2008 | Malik ............. G06F 17/30864 |

OTHER PUBLICATIONS

Aktas, M.S., et al., "Using Hyperlink Features to Personalize Web Search," Computer Science Dept., School of Informatics, Indiana University, 2005.

Balabanovic, M. "An Adaptive Web Page Recommendation Service," 1st Int'l Conf. on Autonomous Agents, Marina del Ray, CA., Feb. 1997.

Beeferman, D., et al., "Agglomerative Clustering of a Search Engine Query Log," ACM SIGKDD Int'l Conf. on Knowledge Discovery and Data Mining (KDD), 2000, pp. 407-416.

Billerbeck, B., et al., "Query Expansion Using Associated Queries," Proceedings of Int'l Conf. on Information Knowledge Management, New Orleans, Louisiana, Nov. 2003, pp. 1-11.

Bomhardt, C., "NewsRec, a SVM-Driven Personal Recommendation System for News Websites," IEEE/WIC/ACM Int'l Conf. on Web Intelligence, 2004.

Brin, S., et al., "The Anatomy of a Large-Scale Hypertextual Web Search Engine," 7th Int'l World Wide Web Conf., Brisbane, Australia, Apr. 1998.

Callan, J., et al., "Personalisation and Recommender Systems in Digital Libraries" Joint NSF-EU DELOS Working Group Report, DELOSNSF Workshop on Personalization and Recommender Systems in Digital Libraries, May 2003.

Chen, L., et al., "WebMate: A Personal Agent for Browsing and Searching," Proceedings of the 2nd International Conference on Autonomous Agents Minneapolis/St. Paul, MN, May 9-13, 1998, Proceedings of the International Conference on Autonomous Agents, New York, NY, ACM, US, May 9, 1998, pp. 132-139.

Chirta, P.A., et al., "PROS: A Personalized Ranking Platform for Web Search,".

Cosley, D., et al., "REFEREE: An Open Framework for Practical Testing in Recommender Systems Using ResearchIndex," Proceedings of the $28^{th}$ VLDB Conference, Hong Kong, China, 2002.

Davison, B.D., et al., "Finding Relevant Website Queries," WWW2003, Budapest, Hungry, May 20-24, 2003, 2 pages.

Dube, J., "Google's New News Alerts," Poynteronline, www.poynter.org/content/content_print.asp"id=43832&custom . . . , Aug. 7, 2003.

Fitzpatrick, L., et al., "Automatic Feedback Using Past Queries: Social Searching?" Proceedings of the $20^{th}$ Annual Int'l ACM SIGIR Conf. on Research and Development in Information Retrieval, ACM Press, New York, New York, 1997, pp. 306-312.

Furner, J., "On Recommending," J. American Society for Information Science and Technology, vol. 53, No. 9, Jan. 2002.

Glance, N.S., "Community Search Assistant," Artificial Intelligence for Web Search, AAAI Press, Jul. 2000, 6 pages, also presented at the AAAI—2000 Workshop on Artificial Intelligence for Web Search, Technical Report WD-00-01.

Haveliwala, T.H., "Topic Sensitive PageRank," PowerPoint Presentation, 2002, pp. 1-15.

Haveliwala, T.H., "Topic-Sensitive PageRank," WWW2002, Honolulu, Hawaii, May 7-11, 2002, 10 pages.

Henzinger, M., "Tutorial: Web Information Retrieval," Google, Inc., http://www.henzinger.com/~monika.

Heylighen, F., "Collective Intelligence and its Implementation on the Web: Algorithms to Develop a Collective Mental Map," Computational & Mathematical Organization Theory. vol. 5, No. 3, 1999.

Ioannidis, Y., et al., "Personalization: Models and Methods," http://thalis.cs.unipi.gr/~isl/db/courses/db3/slides/personal.pdf, 2004.

Jeh, G., et al., "Scaling Personalized Web Search," Proceedings of the $12^{th}$ Int'l World Wide Web Conf., 2003.

Koutrika, G., et al., "Personalization of Queries in Database Systems," Proceedings of the 20th International Conference on Data Engineering, 2004.

Kushmerick, N., et al., "Toward Zero-Input Personalization: Referrer-Based Page Recommendation," P. Brusilovsky, O. Stock, C. Strapparava (Eds.): Adaptive Hypermedia and Adaptive Web-Based Systems International Conference, AH 2000, Trento, Italy, Aug. 2000.

Liu, F., et al., "Personalized Web Search by Mapping User Queries to Categories," Proceedings of CIKM '02, McLean, VA, Nov. 4-9, 2002.

Liu, F., et al., "Personalized Web Search by Improving Retrieval Effectiveness," IEEE Transactions on Knowledge and Data Engineering, vol. 16, No. 1, Jan. 2004.

Markatos, E., et al., "Effective Resource Discovery on the World Wide Web," WebNet 98—World Conference of the WWW, Internet, and Intranet, Orlando, Florida, Nov. 7-12, 1998, pp. 1-6, Retrieved from the Internet: http://citeseer.ist.psu.edu/66509.html.

McNee, S. M., et al., "On the Recommending of Citations for Research Papers," Proceedings of CSCW '02, New Orleans, LA, Nov. 16-20, 2002.

Mobasher, B., et al., "Discovery of Aggregate Usage Profiles for Web Personalization," Proceedings of the Web Mining for E-Commerce Workshop (WEBKDD'2000), Sixth ACM SIGKDD International Conference on Knowledge Discovery and Data Mining, Boston, MA, Aug. 2000.

(56) References Cited

OTHER PUBLICATIONS

Mobasher, B., et al., "Discovery and Evaluation of Aggregate Usage Profiles for Web Personalization," Data Mining and Knowledge Discovery, 6:61-82, 2002.

Papathanasiou, A., et al., "USEwebNET: A Tool for Effective Resource Discovery on the World Wide Web—User's Manual," Internet, Jul. 1999, pp. 1-23, Retrieved from the Internet: http://www.cs.rochester.edu/{papathan/research/USEwebNET/distribution/SUBMIT_DIR-July1999/Documents/Guides/USEwebNET_guide.doc>.

Pemberton, D., et al., "GroupMark: A WWW Recommender System Combining Collaborative and Information Filtering," ERCIM Workshop on "User Interfaces for All", Florence, Italy, Oct. 25-26, 2000.

Pitkow, J., et al., "Personalized Search: A Content Computer Approach May Prove a Breakthrough in Personalized Search Efficiency," Communications of the ACM, vol. 45, No. 9, Sep. 2002.

Ranganathan, S., "Text Classification Combining Clustering and Hierarchical Approaches," Masters thesis, Dept of Electrical Engineering and Computer Science, University of Kansas, defense date May 3, 2004.

Resnick, P., et al., "GroupLens: An Open Architecture for Collaborative Filtering of Netnews," Proceedings of ACM 1994 Conf. on Computer Support Cooperative Work.

Somlo, G., et al., "QueryTracker: An Agent for Tracking Persistent Information Needs," Autonomous Agents and Multiagent Systems, 2004, AAMAS 2004. Proceeding of the Third International Joint Conference on New York, NY, USA, Jul. 19-23, 2004, Piscataway, NJ, USA, IEEE, Jul. 19, 2004, pp. 488-495.

Sugiyama, K., et al., "Adaptive Web Search Based on User Profile Constructed Without Any Effort from Users," Proceedings of the WWW 2004, New York, NY, May 17-22, 2004.

Sun, J.T., et al., "CubeSVD: A Novel Approach to Personalized Web Search," WWW 2005, Chiba, Japan, May 10-14, 2005.

Teevan, J., et al., "Personalizing Search via Automated Analysis of Interests and Activities," Proceedings of the 28th annual international ACM SIGIR conference on Research and development in information retrieval, Salvador, Brazil, 2005.

Terveen, L., et al., "Constructing, Organizing, and Visualizing Collections of Topically Related Web Resources," ACM Transaction on Computer-Human Interaction, 1999.

Verberne, A., et al., "Building a Recommendation Engine for a Personalized Webpad Browser," International Lisp Conference, Oct. 27-31, 2002.

Walkerdine, J., et al., "Sharing Searches: Developing Open Support for Collaborative Searching," Proceedings of Interact 2001, Japan, Jul. 9-13, 2001, 8 pages.

Wen, J.R., et al., "Query Clustering Using User Logs," ACM Transactions on Information Systems, vol. 20, No. 1, Jan. 2002, pp. 59-81.

Woodruff, A., et al., "Enhancing a Digital Book with a Reading Recommender," In Proc. ACM CHI 2000, 2000.

Xu, G., et al., "A Web Recommendation Technique Based on Probabilistic Latent Semantic Analysis," Proceedings of WISE 2005, New York, NY, 2005.

Zaiane, O.R., et al., "Finding Similar Queries to Satisfy Searches Based on Query Traces," Proceedings of the Int'l Workshop on Efficient Web-Based Information Systems (EWIS), Montpellier, France, Sep. 2002, 11 pages.

"Contentious—More Furl Tricks," http://blog.contentious.com/archives/2004/07/01/more-furl-tricks, 2005.

"Copernic Agent: an integrated information retrieval tool," Editorial, www.botspot.com/intelligent_agent/4.html, Oct. 16, 2002.

"LookSmart's Furl—FAQ," http://64.233.167.104/search?q=cache:g3y11OQ_MQAJ: www.furl.net/faq.jsp+furl+recom . . . , 2005.

"LookSmart's Furl—Learn More," http://www.furl.net/learnMore.jsp, 2005.

"Quick Guides—Alerting in Justis.com," http://www.justis.com/support/guide_alerting.html.

"Using A9.com," Frequently Asked Questions, http://a9.com/-/company/help.jsp, (no date).

"Web Searching," Christopher C. Yang, Ed., Slides 1 and 39 of Course Slides from ECT 7010 Fundamentals of E-Commerce Technologies, The Chinese University of Hong Kong, http://www.aect.cuhk.edu.hk/~ect7010, last updated Nov. 25, 2005.

"Welcome to TracerLock," http://www.tracerlock.com, Nov. 8, 2005.

"Your Alert Profile," Reviews.com, www.reviews.com/helpfile/helpfile_smartbox.cfm (no date).

Alexa Internet, Technology Web Page, http://pages.alexa.com/company/tecynolg..html, (no date).

Collaborative Filtering Engine, "News COFE 4.0 Announcement," http://eecs.oregonstate.edu/iis/CoFE, Dec. 17, 2004.

Copernic Technologies Inc, "Copernic 2000 Pro Product Overview," Internet Citation, Jan. 6, 2000, Retrieved from the Internet: http://web.archive.org/web/20000304163502/www.copernic.com/pro/index.htm>.

Google, "Google Alerts (BETA) Frequently Asked Questions," www.google.com/alerts/faq.html?hl=en (no date).

Google, "Google Desktop Download," http://desktop.google.com/?promo=mp-gds-v1-1, 2005.

Google, Google Personalized Search Help (Beta), http://google.com/psearch/help/html, 2005.

Google, "Google Toolbar Help," http://www.google.com/support/toolbar/bin/static.py?page=features.html, 2005.

International Search Report for International Application No. PCT/US2006/062731, mailed Jun. 4, 2007.

Jeh, Notice of Allowance, U.S. Appl. No. 11/323,096, Oct. 10, 2010, 8 pgs.

Jeh, Notice of Allowance, U.S. Appl. No. 11/323,096, Dec. 8, 2010, 12 pgs.

Jeh, Office Action, U.S. Appl. No. 11/323,096, Jul. 2, 2009, 29 pgs.

Jeh, Office Action, U.S. Appl. No. 11/323,096, Jun. 3, 2010, 29 pgs.

Jeh, Office Action, U.S. Appl. No. 11/323,096, Jan. 9, 2008, 20 pgs.

Jeh, Office Action, U.S. Appl. No. 11/323,096, Jul. 10, 2008, 18 pgs.

Jeh, Office Action, U.S. Appl. No. 11/323,096, Jan. 22, 2009, 23 pgs.

Jeh, Office Action, U.S. Appl. No. 11/323,096, Apr. 29, 2010, 29 pgs.

Jeh, Office Action, U.S. Appl. No. 11/323,197, Dec. 31, 2008, 21 pgs.

Jeh, Office Action, U.S. Appl. No. 11/323,197, Feb. 5, 2008, 14 pgs.

Jeh, Office Action, U.S. Appl. No. 11/323,197, Jul. 28, 2008, 18 pgs.

Jeh, Office Action, U.S. Appl. No. 11/447,575, Jan. 6, 2011, 45 pgs.

Jeh, Office Action, U.S. Appl. No. 11/447,575, Apr. 30, 2008, 45 pgs.

Jeh, Office Action, U.S. Appl. No. 11/447,575, May 28, 2009, 41 pgs.

Jeh, Office Action, U.S. Appl. No. 11/447,575, Nov. 9, 2009, 41 pgs.

Jeh, Office Action, U.S. Appl. No. 11/447,575, Jun. 14, 2010, 43 pgs.

Jeh, Office Action, U.S. Appl. No. 11/447,575, Jul. 20, 2011, 49 pgs.

Jeh, Office Action, U.S. Appl. No. 11/447,575, Oct. 31, 2008, 44 pgs.

Jeh, Office Action, U.S. Appl. No. 13/043,400, Oct. 31, 2011, 27 pgs.

PassingNotes.com, "Say farewell to Blogs and Bookmarks and get your Furl on," retrieved Nov. 6, 2005.

Science Direct, "Saving a Search Alert," http://help.sciencedirect.com/robo/projects/sdhelp/s_alert_save.htm, (no date).

"Quick Guides—Alerting in Justis.com," http://www.justis.com/support/guide_alerting.html, Mar. 21, 2005, 3 pgs.

"Using A9.com," Frequently Asked Questions, http://a9.com/-/company/help.jsp, 2006,19 pgs.

"Your Alert Profile," Reviews.com, www.reviews.com/helpfile/helpfile_smartbox.cfm, Nov. 22, 2005, 3 pgs.

Alexa Internet, Technology Web Page, http://pages.alexa.com/company/tecynolg..html, (no date), 2004, 3 pgs.

(56) References Cited

OTHER PUBLICATIONS

Chirita, P.A., et al., "PROS: A Personalized Ranking Platform for Web Search," 2003, 10 pgs.
Google, "Google Alerts (BETA) Frequently Asked Questions," www.google.com/alerts/faq.html?hl=en, Nov. 7, 2005, 4 pgs.
Henzinger, M., "Tutorial: Web Information Retrieval," Google, Inc., http://www.henzinger.com/~monika, Jul. 8, 1999, 16 pgs.
Science Direct, "Saving a Search Alert," http://help.sciencedirect.com/robo/projects/sdhelp/s_alert_save.htm, Nov. 22, 2005, 3 pgs.
Jeh, Office Action, U.S. Appl. No. 13/043,400, Jun. 24, 2013, 18 pgs.

* cited by examiner

Figure 4

User Record 400 in User Information Database 116

ID, SYSTEM, AND GRAPHICAL USER INTERFACE FOR PROVIDING PERSONALIZED RECOMMENDATIONS OF POPULAR SEARCH QUERIES

RELATED APPLICATIONS

This application is a continuation of U.S. application Ser. No. 11/447,575, filed Jun. 5, 2006 now abandoned, which is hereby incorporated by reference in its entirety.

This application is related to U.S. patent application Ser. No. 11/097,884, filed Mar. 31, 2005, entitled "Systems and Methods for Providing Subscription-Based Personalization," which application is incorporated by reference herein in its entirety.

TECHNICAL FIELD

The disclosed embodiments relate generally to search engines. More particularly, the disclosed embodiments relate to methods, systems, and user interfaces for providing personalized recommendations of popular search queries.

BACKGROUND

Search engines typically provide a source of indexed documents from the Internet (or an intranet) that can be rapidly scanned in response to a search query submitted by a user. As the number of documents accessible via the Internet grows, the number of documents that match a particular query may also increase. However, not every document matching the query is likely to be equally important from a user's perspective. A user may be overwhelmed by an enormous number of documents returned by a search engine, unless the documents are ordered based on their relevance to the user's query. One way to order documents is the PageRank algorithm more fully described in the article "The Anatomy of a Large-Scale Hypertextual Search Engine" by S. Brin and L. Page, 7th International World Wide Web Conference, Brisbane, Australia and U.S. Pat. No. 6,285,999, both of which are hereby incorporated by reference as background information.

In addition to responding to search queries, search engines can also proactively identify and recommend popular queries. The recommendation techniques developed to date, however, have only limited utility because they often recommend queries that are not of interest to the user.

Thus, it would be highly desirable to find new, more efficient and accurate ways to provide recommendations of popular search queries.

SUMMARY

The present invention overcomes the problem described above by providing personalized recommendations of popular search queries.

One aspect of the invention involves a computer-implemented method in which a search engine receives a plurality of search queries submitted by a plurality of users; determines submission popularity data for each distinct query in the plurality of search queries; receives Internet usage data for a computer user; determines one or more queries to recommend to the computer user that meet predefined criteria, wherein the predefined criteria are based on the Internet usage data for the computer user and the submission popularity data for the search queries submitted by the plurality of users; and sends links corresponding to at least some of the determined queries to a computer associated with the computer user for display.

Another aspect of the invention involves a computer-implemented method in which a client computer sends Internet usage data for a computer user to a search engine. The search engine receives a plurality of search queries submitted by a plurality of users; determines submission popularity data for each distinct query in the plurality of search queries; receives the Internet usage data for the computer user; and determines one or more queries to recommend to the computer user that meet predefined criteria, wherein the predefined criteria are based on the Internet usage data for the computer user and the submission popularity data for the search queries submitted by the plurality of users. The client computer receives links corresponding to at least some of the determined queries from the search engine and displays at least some of the received links.

Another aspect of the invention involves a graphical user interface on a client computer that includes a plurality of links recommended by a search engine for a computer user. The plurality of queries are determined by the search engine based on Internet usage data for the computer user and submission popularity data for search queries submitted by a plurality of users.

Another aspect of the invention involves a search engine that is configured to receive a plurality of search queries submitted by a plurality of users; determine submission popularity data for each distinct query in the plurality of search queries; receive Internet usage data for a computer user; determine one or more queries to recommend to the computer user that meet predefined criteria, wherein the predefined criteria are based on the Internet usage data for the computer user and the submission popularity data for the search queries submitted by the plurality of users; and send links corresponding to at least some of the determined queries to a computer associated with the computer user for display.

Another aspect of the invention involves a client computer that is configured to send Internet usage data for a computer user to a search engine. The search engine receives a plurality of search queries submitted by a plurality of users; determines submission popularity data for each distinct query in the plurality of search queries; receives the Internet usage data for the computer user; and determines one or more queries to recommend to the computer user that meet predefined criteria, wherein the predefined criteria are based on the Internet usage data for the computer user and the submission popularity data for the search queries submitted by the plurality of users. The client computer is configured to receive links corresponding to at least some of the determined queries from the search engine and display at least some of the received links.

Another aspect of the invention involves a computer-program product that includes a computer readable storage medium and a computer program mechanism embedded therein. The computer program mechanism includes instructions, which when executed by a search engine, cause the search engine to receive a plurality of search queries submitted by a plurality of users; determine submission popularity data for each distinct query in the plurality of search queries; receive Internet usage data for a computer user; determine one or more queries to recommend to the computer user that meet predefined criteria, wherein the predefined criteria are based on the Internet usage data for the computer user and the submission popularity data for the search queries submitted by the plurality of users; and send links corresponding to at least some of the determined queries to a computer associated with the computer user for display.

Another aspect of the invention involves a computer-program product that includes a computer readable storage medium and a computer program mechanism embedded therein. The computer program mechanism includes instructions, which when executed by a client computer, cause the client computer to send Internet usage data for a computer user to a search engine. The search engine receives a plurality of search queries submitted by a plurality of users; determines submission popularity data for each distinct query in the plurality of search queries; receives the Internet usage data for the computer user; and determines one or more queries to recommend to the computer user that meet predefined criteria, wherein the predefined criteria are based on the Internet usage data for the computer user and the submission popularity data for the search queries submitted by the plurality of users. The computer program mechanism also includes instructions, which when executed by the client computer, cause the client computer to receive links corresponding to at least some of the determined queries from the search engine; and display at least some of the received links.

Another aspect of the invention involves a search engine with means for receiving a plurality of search queries submitted by a plurality of users; means for determining submission popularity data for each distinct query in the plurality of search queries; means for receiving Internet usage data for a computer user; means for determining one or more queries to recommend to the computer user that meet predefined criteria, wherein the predefined criteria are based on the Internet usage data for the computer user and the submission popularity data for the search queries submitted by the plurality of users; and means for sending links corresponding to at least some of the determined queries to a computer associated with the computer user for display.

Another aspect of the invention involves a client computer with means for sending Internet usage data for a computer user to a search engine. The search engine receives a plurality of search queries submitted by a plurality of users; determines submission popularity data for each distinct query in the plurality of search queries; receives the Internet usage data for the computer user; and determines one or more queries to recommend to the computer user that meet predefined criteria, wherein the predefined criteria are based on the Internet usage data for the computer user and the submission popularity data for the search queries submitted by the plurality of users. The client computer also has means for receiving links corresponding to at least some of the determined queries from the search engine; and means for displaying at least some of the received links.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

Figure 4:
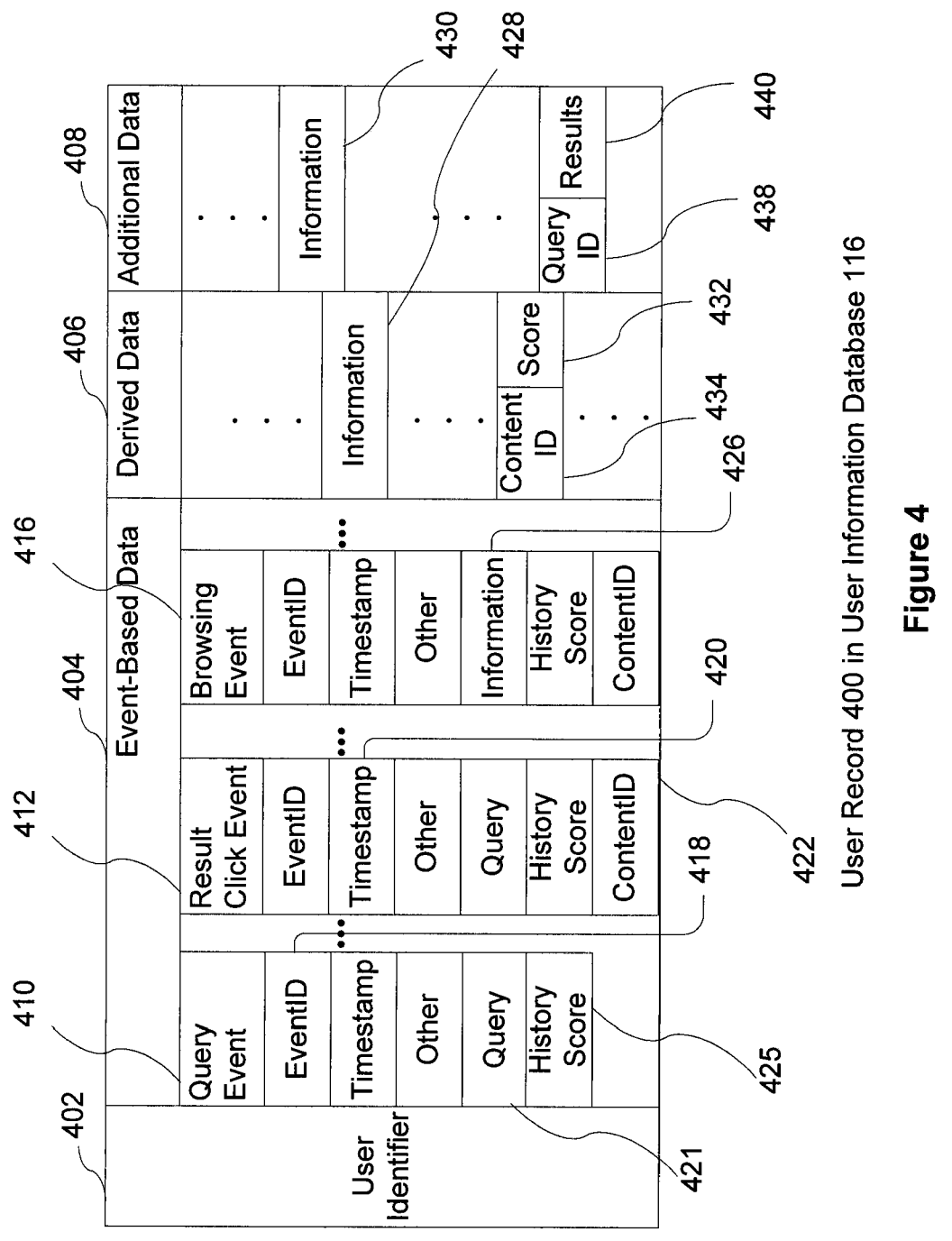

FIG. 4 is an exemplary user record in the user information database in accordance with one embodiment of the invention.

DESCRIPTION OF EMBODIMENTS

Methods, systems, and user interfaces for providing personalized recommendations of popular search queries are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 1:
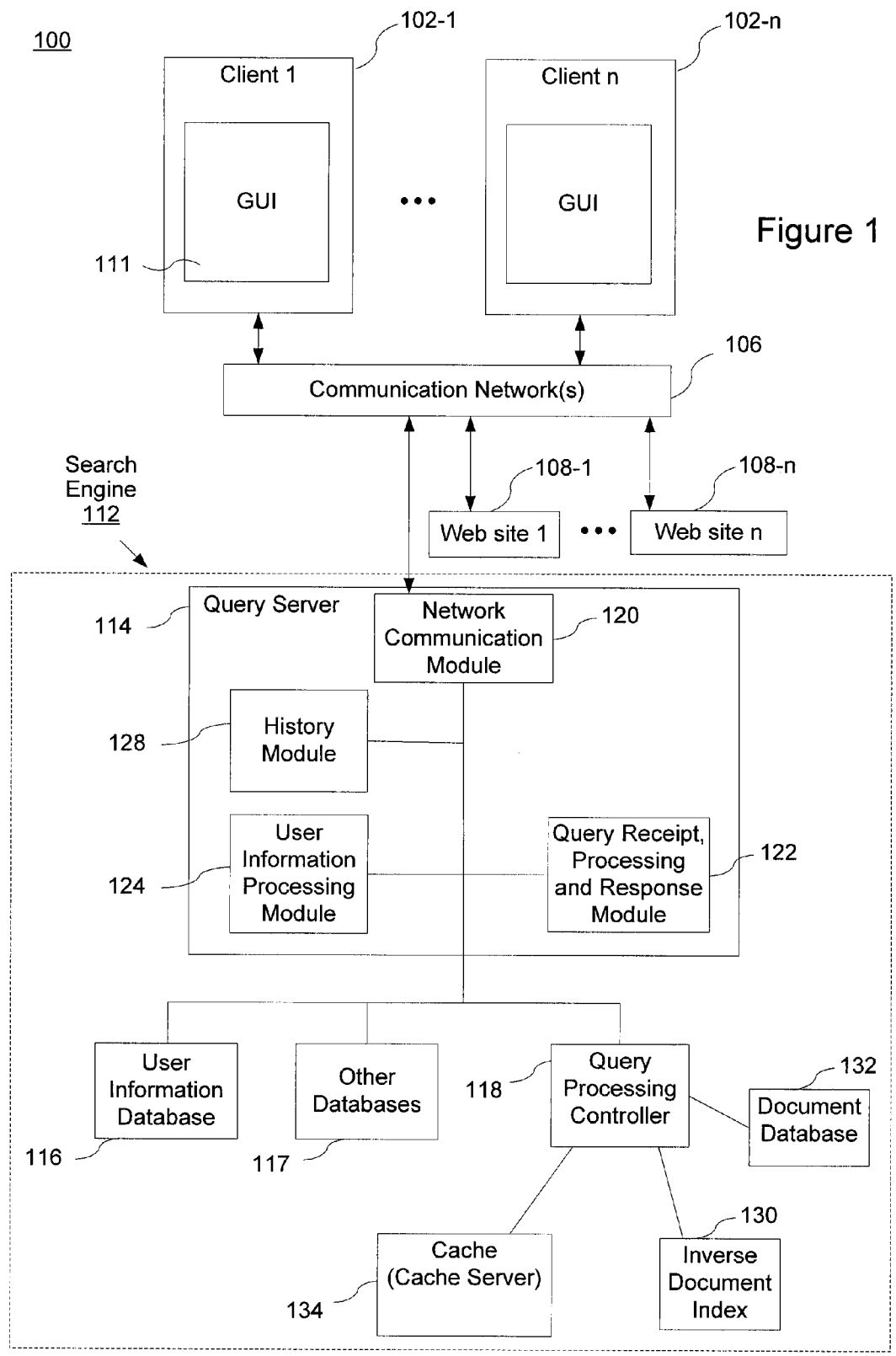
FIG. 1 is a block diagram illustrating an exemplary distributed computer system in accordance with one embodiment of the invention.

FIG. 1 is a block diagram illustrating an exemplary distributed computer system 100 according to one embodiment of the invention. FIG. 1 shows various functional components that will be referred to in the detailed discussion that follows. The system 100 may include one or more clients 102. Client computers 102 can be any of a number of computing devices (e.g., computer, internet kiosk, personal digital assistant, cell phone, gaming device, desktop computer, or laptop computer) used to enable the activities described below. Client 102 includes graphical user interface (GUI) 111. Clients 102 are connected to a communications network 106. The communications network 106 connects the clients 102 to a search engine system 112. Search engine 112 includes a query server 114 connected to the communications network 106, a user information database 116, a query processing controller 118, and optionally other databases 117.

Search engine 112 generates search results in response to search queries from one or more clients 102 and also provides personalized recommendations of popular search queries. It should be appreciated that the layout of the search engine system 112 is merely exemplary and may take on any other suitable layout or configuration. The search engine system 112 is used to search an index of documents, such as billions of web pages or other documents indexed by modern search engines.

Note that the search engine system 112 can be used as an Internet search engine, for locating documents on the WWW and/or as an intranet search engine, for locating documents stored on servers or other hosts within an intranet. In some embodiments, the search engine system 112 utilizes an index 130 of the full text of a set of documents. However, the methodology described herein is also applicable to implementations where only portions of documents, such as titles and abstracts, are stored in a database (e.g., 132) of the search engine system 112.

The search engine system 112 may include multiple data centers, each housing a backend. The data centers are generally widely dispersed from one another, such as across the continental United States. Search queries submitted by users at one of the clients 102 to the search engine system 112 are routed to an appropriate backend as part of the Domain Name System (DNS), based on current load, geographic locality and/or whether that data center is operating.

Each backend preferably includes multiple query servers, such as query server 114, coupled to a communications network 106 via a network communication module 120. The communications network 106 may be the Internet, but may also be any local area network (LAN) and/or wide area network (WAN). In some embodiments, each query server 114 is a Web server that receives search query requests and delivers search results and personalized recommendations of popular search queries in the form of web pages or feeds via HTTP, XML, RSS or similar protocols. Alternatively, if the query server 114 is used within an intranet, it may be an intranet server. In essence, the query servers, such as query server 114, are configured to control the search and recommendation processes, including searching a document index, analyzing and formatting the search results.

The query server 114 typically includes a network communications module 120, a query receipt, processing and response module 122, a user information processing module 124, and a history module 128, all interconnected. The network communications module 120 connects the query server 114 to the communication network 106 and enables the receipt of communications from the communication network 106 and the provision of communications to the communication network 106 bound for the client 102 or other destinations. The query receipt, processing and response module 122 is primarily responsible for receiving search queries, processing them and returning responses and personalized recommendations of popular search queries to the client 102 via the network communications module 120. In some embodiments, the history module 128 maintains a record of queries submitted by users. In some embodiments, the history module also maintains a record of search results selected by the users for viewing or downloading, sometimes called click through information. The click through information may include statistical information, including the number of times that each search result was clicked through and/or the number of times each search result was viewed by users for more than a threshold period of time (i.e., the number of times the users clicked through each search result without navigating away from the resulting page or document in less than the threshold period of time).

The user information processing module 124 assists in accessing, updating and modifying the user information database 116. The user information database 116 stores various information about the user's activities in a user record (described below). In addition, the user information database 116 may store derived information about the user based on the user's activities. In some embodiments, the user information database 116 stores user profiles, a portion of which are the derived information. The other databases 117 optionally include other databases with which the various modules in query server 114 may interact, such as a message database (electronic or otherwise), and user-created document databases (e.g., documents created from word processing programs, spreadsheet programs, or other various applications).

The query processing controller 118 is connected to an inverse document index 130, a document database 132 and a query cache 134. The cache 134 is used to temporarily store search queries and search results, and is used to serve search results for queries submitted multiple times (e.g., by multiple users). The inverse document index 130 and document database 132 are sometimes collectively called the document database. In some embodiments, "searching the document database" means searching the inverse document index 130 to identify documents matching a specified search query or term.

Search rank values for the documents in the search results are conveyed to the query processing controller 118 and/or the query server 114, and are used to construct various lists, such as a list of ordered search results, a personalized list of recommended web pages, or a list of new results for one or more prior searches by a user. Once the query processing controller 118 constructs the list, the query processing controller 118 may transmit to the document database 132 a request for snippets of an appropriate subset of the documents in the list. For example, the query processing controller 118 may request snippets for the first fifteen or so of the documents in the list. In some embodiments, the document database 132 constructs snippets based on the search query, and returns the snippets to the query processing controller 118. The query processing controller 118 then returns a list of located documents with their associated links (i.e., hyperlinks) and snippets back to the query server 114. In some embodiments, the snippets are stored in the cache server 134 along with the search results. As a result, in these embodiments the query processing controller 118 may only request snippets for documents, if any, for which it is unable to obtain valid cached snippets from the cache server 134.

In some embodiments, fewer and/or additional modules, functions or databases are included in the search engine 112. The modules shown in FIG. 1 as being part of search engine 112 represent functions performed in an exemplary embodiment.

Although FIG. 1 portrays discrete blocks, the figure is intended more as a functional description of some embodiments of the invention rather than a structural description of the functional elements. One of ordinary skill in the art will recognize that an actual implementation might have the functional elements grouped or split among various components. For example, the user information database 116 may be part of the query server 114. In some embodiments the user information database 116 may be implemented using one or more servers whose primary function is to store and process user information. Similarly, the document database 132 may be implemented on one or more servers whose primary purpose is to store various documents. In some embodiments, the inverse document index 130 and the document database 132 are stored on the same server or set of servers. Moreover, one or more of the blocks in FIG. 1 may be implemented on one or more servers designed to provide the described functionality. Although the description herein refers to certain features implemented in the client 102 and certain features implemented in the search system 112, the embodiments of the invention are not limited to such distinctions. For example, features described herein as being part of the search system 112 could be implemented in whole or in part in the client 102, and vice versa.

Figure 2A:
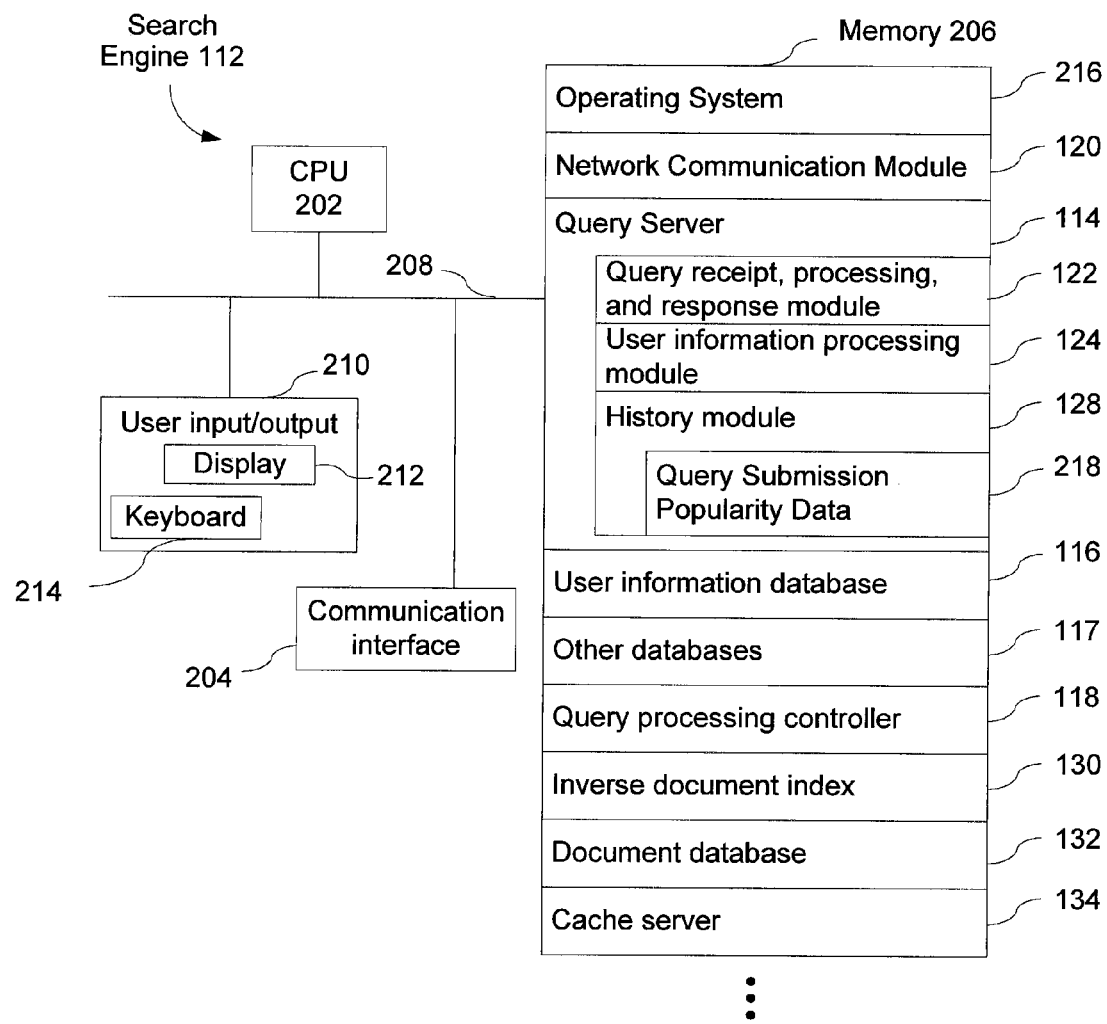
FIG. 2A is a block diagram illustrating a search engine in accordance with one embodiment of the invention.

FIG. 2A is a block diagram illustrating search engine 112 in accordance with one embodiment of the present invention. Search engine 112 typically includes one or more processing units (CPU's) 202, one or more network or other communications interfaces 204, memory 206, and one or more communication buses 208 for interconnecting these components. The communication buses 208 may include circuitry (sometimes called a chipset) that interconnects and controls communications between system components. Search engine 112 optionally may include a user interface 210 comprising a display device 212 and a keyboard 214. Memory 206 may include high speed random access memory and may also include non-volatile memory, such as one or more magnetic or optical disk storage devices. Memory 206 may optionally include one or more storage devices remotely located from the CPU(s) 202. In some embodiments, the memory 206 stores the following programs, modules and data structures, or a subset or superset thereof:

- an operating system 216 that includes procedures for handling various basic system services and for performing hardware dependent tasks;
- a network communication module (or instructions) 120 that is used for connecting search engine 112 to other computers (e.g., clients 102 and web sites 108) via one or more communication network interfaces 204 (wired or wireless) and one or more communication networks, such as the Internet, other wide area networks, local area networks, metropolitan area networks, and so on;
- a query server 114 for responding to and processing communications from the client 102 and for providing personalized recommendations of popular search queries;
- a user information database 116 for storing information about users as described in reference to FIG. 4;
- other databases 117 that the various modules in query server 114 may interact with, such as a message database (electronic or otherwise), and user-created document databases (e.g., documents created from word processing programs, spreadsheet programs, or other various applications);
- a query processing controller 118 for receiving requests from one of the query servers, such as the query server 114, and transmitting the requests to the cache 134, the inverse document index 130 and the document database 132;
- an inverse document index 130 for storing a set of words contained in document database 132 and, for each word, pointers to documents in document database 132 that contain the word;
- a document database 132 for storing documents or portions of documents such as web pages; and
- a cache server 134 for increasing search efficiency by temporarily storing previously submitted search queries and corresponding search results.

In some embodiments, the query server 114 includes the following elements, or a subset of such elements: a query receipt, processing and response module 122 for receiving and responding to search queries and for providing personalized recommendations of popular search queries; and managing the processing of search queries by one or more query processing controllers, such as query processing controller 118, that are coupled to the query server 114; a user information and processing module 124 for accessing and modifying the user information database 116, which includes one or more user records 400 (described in more detail in FIG. 4 below); and a history module 128 for processing and handling requests for searching a user's online history (e.g., the user's prior queries, query result click throughs and visited URLs) and for processing and storing query submission popularity data structures 218. In some embodiments, the query server 114 and/or the user information database 116 include additional modules.

Figure 2B:
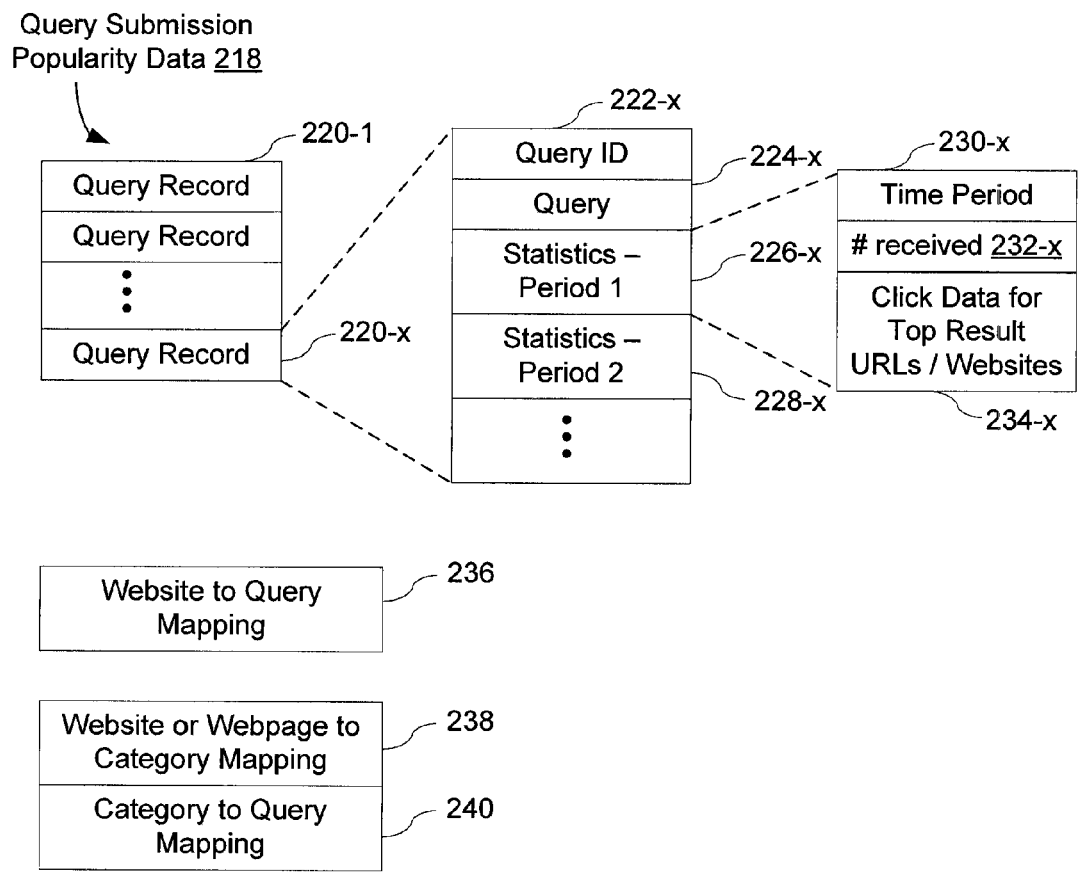
FIG. 2B is a block diagram illustrating query submission popularity data structures in accordance with one embodiment of the invention.

FIG. 2B is a block diagram illustrating query submission popularity data structures in accordance with one embodiment of the invention. Query submission popularity data structures 218 include query records 220, for example query record 220-1 through 220-x, where x may represent the number of distinct queries. Query submission popularity data structures 218 may also include:

- Website to query mapping 236 that associates websites with queries and vice versa (e.g., associating a particular website with a particular query if a web page within the particular website is a search result for the particular query that is clicked on by a plurality of users);
- Website or webpage to category mapping 238 that associates a website or webpage with one or more categories and vice versa (e.g., topics in the Open Directory Project (http://dmoz.org)); and
- Category to query mapping 240 that associates categories with queries and vice versa (e.g., associating a particular category with a particular query if a web page or web site within the particular category is a search result for the particular query that is clicked on by a plurality of users or associating a particular category with a particular query if a predefined percentage and/or number of users that submit the particular query also have the particular category in their user profile);

A query record 220 may include the following data, or a subset or superset thereof:

- Query ID 222 (e.g., an n-bit binary number assigned by the query server 114) that uniquely identifies a particular query;
- Query 224 that contains the search strings/terms included in the query;
- Statistics for a first time period 226 that include the number of times 232 that query 224 was received during time period 230 (e.g., the past day or week) and click through data 234 for the top result URLs and/or web sites that are visited by a plurality of users by clicking on search results for query 224 during time period 230; and
- Analogous statistics for a second time period 228 (e.g., the day or week immediately preceding the day or week, respectively, of time period 230).

Figure 3:
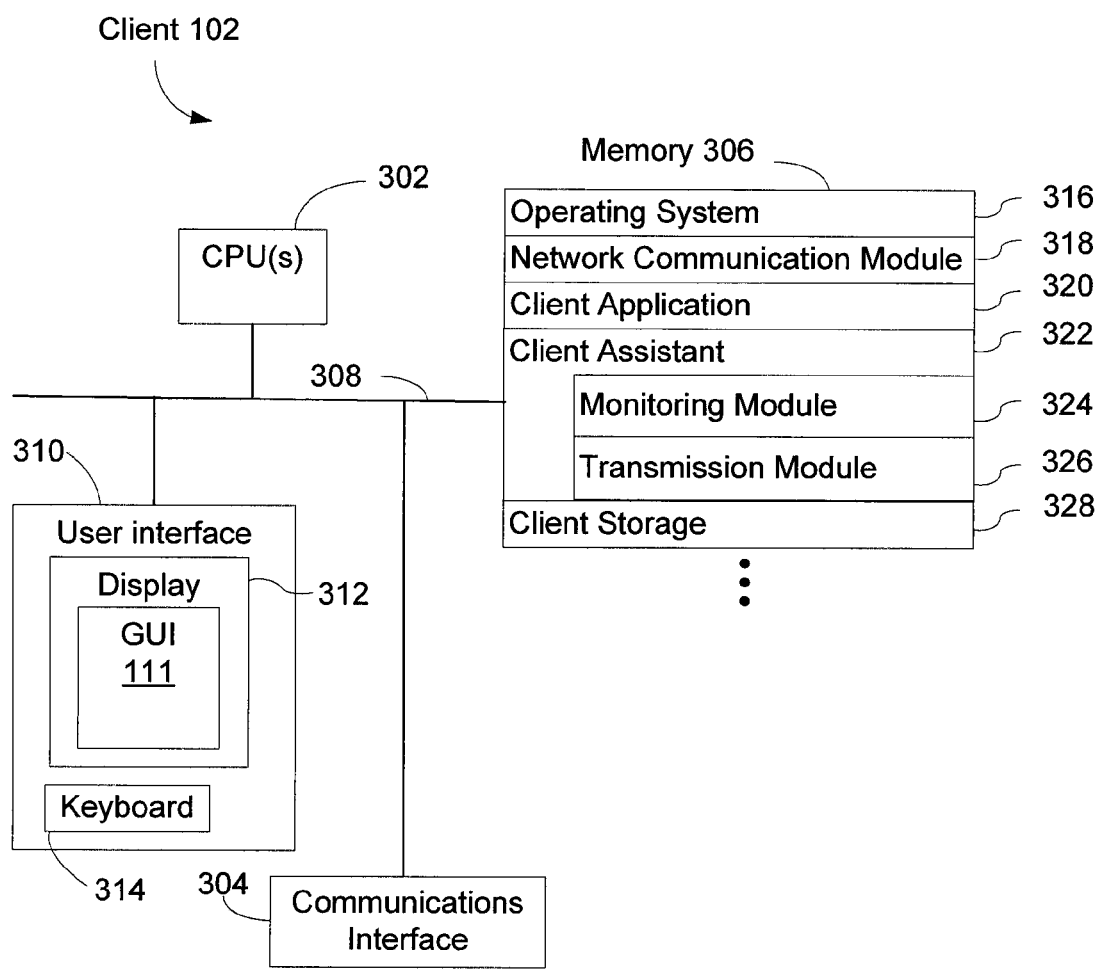
FIG. 3 is a block diagram illustrating a client in accordance with one embodiment of the invention.

FIG. 3 is a block diagram illustrating client 102 in accordance with one embodiment of the invention. Client 102 typically includes one or more processing units (CPUs) 302, one or more network or other communications interfaces 304, memory 306, and one or more communication buses 308 for interconnecting these components. The communication buses 308 may include circuitry (sometimes called a chipset) that interconnects and controls communications between system components. The client system 102 may include a user interface 310, for instance a display 312 with GUI 111 and a keyboard 314. Memory 306 may include high speed random access memory and may also include non-volatile memory, such as one or more magnetic or optical storage disks. Memory 306 may include mass storage that is remotely located from CPUs 302. Memory 306 may store the following elements, or a subset or superset of such elements:

- an operating system 316 that includes procedures for handling various basic system services and for performing hardware dependent tasks;

a network communication module (or instructions) 318 that is used for connecting the client system 102 to other computers via the one or more communications interfaces 304 (wired or wireless) and one or more communication networks, such as the Internet, other wide area networks, local area networks, metropolitan area networks, and so on;

a client application 320 such as a browser application;

a client assistant 322 (e.g., a toolbar, iframe (inline frame), or browser plug-in), which includes a monitoring module 324 for monitoring the activities of a user (e.g., monitoring user click throughs of search results, duration of user viewing documents corresponding to search result click throughs, etc.), and a transmission module 326 for transmitting information about the user's activities to and receiving information from the search system 112; and client storage 328 for storing data and documents, including web pages or feeds with personalized popular query recommendations.

Each of the above identified modules and applications in FIGS. 2-3 correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memories 206 and 306 may store a subset of the modules and data structures identified above. Furthermore, memories 206 and 306 may store additional modules and data structures not described above.

Although FIGS. 2-3 show search engine 112 and client 102 as a number of discrete items, FIGS. 2-3 are intended more as a functional description of the various features which may be present in search engine 112 and client 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in search engine 112 and how features are allocated among them will vary from one implementation to another, and may depend in part on the amount of data traffic that the system must handle during peak usage periods as well as during average usage periods.

FIG. 4 is an exemplary user record 400 from the user information database 116 (FIG. 1) in accordance with one embodiment of the invention. In some embodiments, user record 400 contains a subset or a superset of the elements depicted in FIG. 4. User record 400 contains a user identifier 402 that associates the information in user record 400 to a particular user or user identifier. In some embodiments, the user identifier 402 is associated with a particular instance of a client application 320. In some embodiments, the user identifier is associated with a computer user (e.g., when the user logs in with a username and password). Some of the information that can be associated with a user includes event-based data 404, derived data 406, and additional data 408. Event-based data 404 includes one or more events, each of which has a data type associated with it. In some embodiments, event-based data includes: one or more queries 410; one or more result clicks 412 (i.e., the results presented in a set of search results on which the user has clicked); and one or more browsing data 416 (e.g., URLs visited, URL visit duration data, etc.). Event-based data 404 includes one or more elements relevant to the event. For example, in some embodiments the events in the event-based data 404 includes either or both an eventID 418 and a timestamp 420. The eventID 418 is a unique identifier associated with the particular event which may be assigned by the search system in some embodiments (e.g., a 64-bit binary number). The timestamp 420 is a value (e.g., a 64-bit binary number) representing the date and/or time at which the particular event record in event-based data 404 was created or at which the particular event occurred.

In some embodiments, one or more of the query events 410, and one or more of the result click events 412, include a query portion 421 which includes zero or more query terms associated with the recorded event. In some embodiments, the query portion indicates the query string to which the event is associated (e.g., what query produced the results that the user clicked-though). In some embodiments, the query portion 421 includes a pointer or identifier to the query event 410 associated with the result click (e.g., an eventID). In some embodiments, the query portion 421 may additionally identify a "related query". For example, the related query may be a query related to an initial query that contains a misspelling. In some instances is it more desirable to associate the event with the corrected query rather than the query containing the spelling mistake. In some embodiments, the search system 112 may generate "related queries" automatically based on the user's entered query.

In some embodiments, one or more of the result click events 412, and one or more of the browsing data 416 include a contentID 422 which identifies the content associated with the particular event. For a result click 412, the contentID can represent the URL or URI (Uniform Resource Identifier) that has been clicked on by the user. For browsing event 416, the contentID 422 can be the content identifier used to identify the location of the browse event (e.g., URL, data location, or other similar identifier). In some embodiments, the contentID 422 may be a document identifier that identifies a document in a document repository.

In some embodiments, the event-based data has a history score 425. An event's history score 425 may be calculated in any of a number of different ways or combinations of ways. For example, the history score 425 may be a time-based ranking value which may be periodically modified based on a length of time that has passed since the event was recorded. In some embodiments, the value of the history score decreases as the time from the recordation increases. For example, all the history scores in the event-based data may be multiplied by a predetermined factor (e.g., a value less than one, such as 0.9, 0.8, 0.75 or 0.5) at predetermined times (e.g., at a fixed time of each day or week) so as to attenuate the history scores over time. In some embodiments, event data having a time-based ranking value below a threshold may be deleted. The values can be determined and re-determined periodically at various points in time. In some cases, removal of one or more events triggers a re-determination of one or more derived values as described above. In some embodiments, the history score 425 is determined in response to a request instead of being determined during batch or off-line processing.

In some embodiments, a browsing event 416 indicates a particular browsing event not associated with a query, but instead, with some other user activity (e.g., user selection of a link in a web page, or an email message, or a word processing document). This other user activity can be identified in an information field 426. In some embodiments, the information field 426 stores ranking values associated with the event. Such ranking values can be system generated, user created, or user modified (e.g., PageRank for URLs, or a value assigned to the event by the user). Other examples of user activity include, but are not limited to web browsing, emailing, instant messaging, word processing, participation in chat rooms, software application execution and internet telephone calls.

In some embodiments, derived data 406 includes one or more information fields 428 containing information derived from the event-based data 404. For example, in some embodiments, the information field 428 represents a user profile which is generated from one or more of the user's query events 410, results click events 412, and browsing events 416. For example, by examining one or more of the various events a user profile may be created that includes one or more information fields 428 indicating levels of interest in various topic categories (e.g., a weighted set of Open Directory Project (http://dmoz.org) topics). Alternately, one or more information fields 428 in the user record 400 indicate topic categories associated with web pages or other documents visited by the user, without any indication of weightings or levels of interest, but only including topic categories which satisfy predefined criteria indicating at least a threshold level of user interest. In some embodiments, the one or more information fields 428 in the user record 400 indicate websites associated with web pages or other documents visited by the user. In these embodiments, the one or more information fields 428 may optionally include weights or level of interest values for the identified websites; alternately, the website information in information fields 428 may be restricted to websites which satisfy predefined criteria indicating at least a threshold level of user interest.

In some embodiments, the derived data 406 includes one or more pairs of a score 432 associated with particular contentID 434. The score 432 represents a derived score assigned to the content associated with the contentID 434 (e.g., a web page). The score 432 can be based on one or more of a number of different factors. In some embodiments, the score 432 incorporates the number of times that a user has clicked on the contentID over a period of time (which may include click throughs as a result of search queries and/or browsing activities). In some embodiments, the score 432 incorporates a time duration that the user is estimated to have been looking at the content (a stay-time). In some embodiments, the score 432 incorporates a time since the user last viewed the content. In some embodiments, the score 432 may be modified based on user activities. In some embodiments, the score 432 is negatively affected if the user is presented the content in a series of search results, but fails to select the content from the results page. In some embodiments, the score 432 is positively affected when the user visits locations or pages or clicks on results that are similar to the content. Similarity can be determined by a number of well-known techniques (e.g., text classifier, ODP categorization, link structure, URL, edit distance, etc.). In some embodiments, similarity can be determined by co-citation analysis. In some embodiments, a site is defined as a logically related group of pages, or physically related pages such as pages belonging to the same URL or related URLs. In some embodiments, the score 432 incorporates the number of past queries of the user for which the content was presented (e.g., a higher number of times certain content is presented to the user correlates with a higher score 432). In some embodiments, the score 432 incorporates the number of past queries of the user for which related content was presented (e.g., a higher number of times related content is presented to the user as a result of the user's queries correlates with a higher score 432). In some embodiments, derived data 406 includes aggregate scores. For example, the same query may be generated by the user multiple times and in some embodiments each occurrence will have a different eventID. Accordingly, in some embodiments, an aggregate score is maintained for events that occur multiple times. The aggregate score can be computed by any of a number of different methods. A reference to the multiple events and to the aggregate score can be maintained in the derived data 406.

Figure 5:
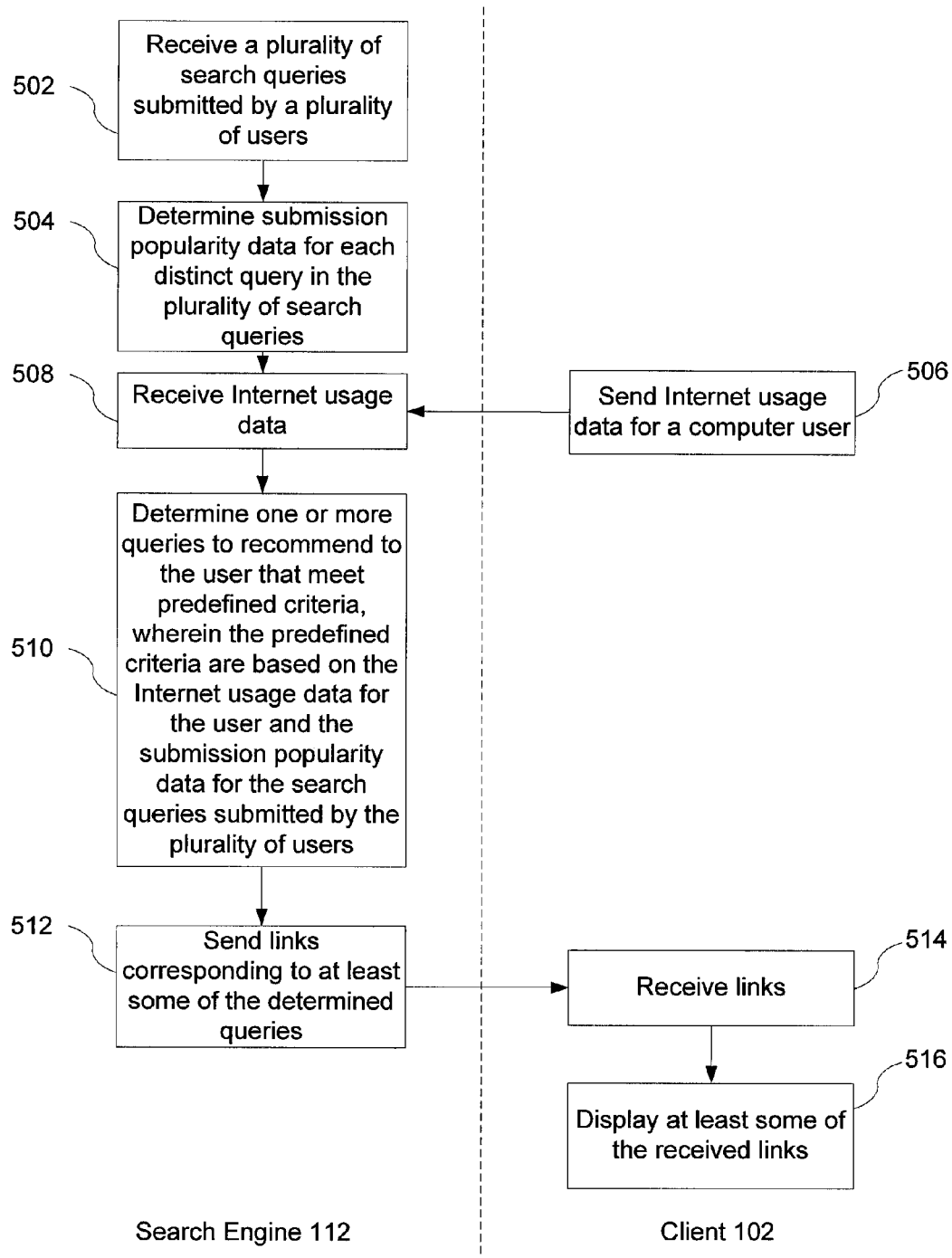
FIG. 5 is a flowchart representing a method of providing personalized recommendations of popular search queries in accordance with one embodiment of the invention.

FIG. 5 is a flowchart representing a method of providing personalized recommendations of popular search queries in accordance with one embodiment of the invention. FIG. 5 shows processes performed by search engine 112 and client 102. It will be appreciated by those of ordinary skill in the art that one or more of the acts described may be performed by hardware, software, or a combination thereof, as may be embodied in one or more computing systems.

Query server 114 in search engine 112 receives (502) a plurality of search queries submitted by a plurality of users.

Query server 114 determines (504) submission popularity data 218 (FIG. 2) for each distinct query in the plurality of search queries.

In some embodiments, the submission popularity data 218 (see FIG. 2) include the number of times 232 the distinct query (e.g., 224) was received in a predefined time period (e.g., 230). In some embodiments, the submission popularity data 218 include the change in the number of times the distinct query was received between two predefined time periods (e.g., the difference in the number received 232 in period 1 226 versus a prior period 2 228). In some embodiments, the submission popularity data 218 include the percentage change in the number of times the distinct query was received between two predefined time periods (e.g., the percentage change in the number received 232 in period 1 226 versus period 2 228).

In some embodiments, for each distinct query 224 in the plurality of search queries, the query 224 is associated with one or more web sites, e.g., via website to query mapping 236. In some embodiments, the associated web sites contain web pages that are selected by at least some of the plurality of users from among search results produced in response to the distinct query 224.

In some embodiments, for each distinct query 224 in the plurality of search queries, the query 224 is associated with one or more categories, e.g., via category to query mapping 240. In some embodiments, the associated categories contain (i.e., are associated with) web pages that are selected by at least some of the plurality of users from among search results produced in response to various search queries, including the aforementioned distinct query 224. In some embodiments, the associated categories contain web sites with web pages that are selected by at least some of the plurality of users from among search results produced in response to various search queries, including the aforementioned distinct query 224.

In some embodiments, for each distinct query 224 in the plurality of search queries, query server 114 determines (504) submission popularity data 218 for the query 224, and associates the query 224 with one or more web sites, e.g., via website to query mapping 236, wherein the web sites contain web pages that are selected by at least some of the plurality of users in response to the distinct query 224.

Prior to sending Internet usage data for a computer user, client 102 receives login information for the user, such as a username and password, and sends the information to search engine 112 via communications network 106. Search engine 112 receives and verifies the login information, thereby enabling search engine 112 to associate subsequent data received from client 102 (e.g., Internet usage data such as event-based data 404) with a particular user record 400 in user information database 116. In some embodiments, the user must pre-approve the use of the user's Internet usage data (e.g., via an opt-in process) and thus Internet usage data of users who have not given their approval is excluded from the submission popularity data.

Client 102 sends (506) Internet usage data for a computer user to search engine 112 via communications network 106. In some embodiments, client 102 is the computer used by the user to enter login information for the search engine 112. In some embodiments, the user has previously registered with the search engine 112.

In some embodiments, the Internet usage data include data about the user's interactions with search engine 112 (e.g., query events 410 and result click events 512). In some embodiments, the data about the user's interactions with the search engine include search queries by the user (e.g., queries 421 in query events 410), times of search queries by the user (e.g., timestamps 420 in query events 410), links in search results that were activated by the user (e.g., contentID 422 in result click events 412), and/or times that links in search results were activated by the user (e.g., timestamps 420 in result click events 412).

In some embodiments, the Internet usage data include data about the user's web browsing (e.g., browsing events 416). In some embodiments, the data about the user's web browsing include addresses of web pages browsed by the user (e.g., contentID 422 in browsing events 416), times when web pages were accessed by the user (e.g., timestamps 420 in browsing events 416), and/or lengths of time that web pages were displayed to the user.

In some embodiments, the Internet usage data include click stream data for a computer user (e.g., event-based data 404). In some embodiments, the Internet usage data is collected over a period of days, weeks, or months.

Search engine 112 (e.g., query server 114 in the search engine 112) receives (508) the Internet usage data for the computer user. In some embodiments, the Internet usage data includes web pages selected by the computer user. In some embodiments, the selected web pages correspond to search results selected by the computer user (e.g., contentID 422 in result click events 412). In some embodiments, the Internet usage data includes queries by the computer user (e.g., queries 421 in query events 410). In some embodiments, search engine 112 stores the Internet usage data in user record 400 in user information database 116.

Query server 114 determines (510) one or more queries to recommend to the computer user that meet predefined criteria. The predefined criteria are based on the Internet usage data for the computer user and the submission popularity data 218 for the search queries submitted by the plurality of users.

In some embodiments, the predefined criteria include that (1) the determined query is associated with a plurality of web sites that contain web pages in the computer user's Internet usage data, and (2) the change in the number of times the determined query was received between two predefined time periods exceeds a predefined value or percentage. For example, the determined query may be "world series" if (1) the computer user's Internet usage data indicates that the computer user has looked at web pages in sports-related web sites (e.g., www.ESPN.com and www.Foxsports.com) that other users have visited in response to the query "world series" and (2) the change in the number 232 of "world series" queries received by search engine 112 between period 1 226 (e.g., this week) and period 2 228 (e.g., last week) exceeds a particular number or percentage. In this example, there may be a large change in the number of "world series" queries around the time that the baseball world series is being played, but this popular search query is not recommended to all users because many of these users may have no interest in baseball. Instead, the "world series" query is recommended to users whose Internet usage history indicates that they visit sports-related web sites that contain pages that are often clicked on by other users as search results to the query "world series." In some embodiments, the association between web sites (e.g., www.ESPN.com and www.Foxsports.com) and queries (e.g., "world series") is made via website to query mapping 236.

In some embodiments, the predefined criteria exclude queries in the computer user's Internet usage data. For example, if the computer user's record 400 indicated that the computer user had already submitted "world series" as a query 421, then "world series" would not be recommended to the computer user as a personalized popular search query. Alternately, the query would not be recommended if the user had already submitted the same query within a predefined period of time (e.g., one week, two weeks, or a month).

In some embodiments, the predefined criteria include that the determined query is associated with a plurality of web sites containing web pages in the computer user's Internet usage data. In some embodiments, the associated web sites exceed a predetermined number. For example, it may be required that the "world series" query is associated with two or more web sites (e.g., www.ESPN.com and www.Foxsports.com) that contain web pages in the computer user's Internet usage data.

In some embodiments, the predefined criteria include that the determined query is associated with one or more categories containing (i.e., associated with) web pages in the computer user's Internet usage data. For example, the determined query may be "world series" if this query is associated (e.g., via mappings 238 and 240) with one or more categories (e.g., sports) containing web pages in the computer user's Internet usage data. In this example, "world series" is recommended to a user whose Internet usage history indicates that he or she visits sports-related web pages. For example, the one or more categories associated with a respective query may be compared with the categories identified in the user record 400 (FIG. 4) to determine if the respective query is likely to be of interest to the user. In those embodiments in which the user record 400 of a user includes weightings or level of interest values for the identified categories, those values may be used to order and/or select from among a set of queries that are potentially of interest to the user.

In some embodiments, the predefined criteria include that the determined query is associated with a plurality of categories (i.e., two or more categories) containing web pages in the computer user's Internet usage data.

In some embodiments, the predefined criteria include that the number of times the determined query was received in a predefined time period exceeds a predefined value. For example, the number 232 of "world series" queries received by search engine 112 in period 1 226 (e.g., this week) exceeds a particular number (e.g., 2000).

In some embodiments, the predefined criteria include that the change in the number of times the determined query was received between two predefined time periods exceeds a predefined value. For example, the change in the number 232 of "world series" queries received by search engine 112 between period 1 226 (e.g., this week) and period 2 228 (e.g., last week) exceeds a particular number (e.g., an increase of at least 10,000 queries).

In some embodiments, the predefined criteria include that the percentage change in the number of times the determined query was received between two predefined time periods exceeds a predefined value. For example, the percentage change in the number 232 of "world series" queries received by search engine 112 between period 1 226 (e.g., this week) and period 2 228 (e.g., last week) exceeds a particular number (e.g., an increase of at least 50 percent, 100 percent, 200 percent, or 300 percent).

In some embodiments, the predefined criteria include that the change in the number of times the determined query was received between two predefined time periods exceeds a first predefined value and the percentage change in the number of times the determined query was received between two predefined time periods exceeds a second predefined value. For example, the change in the number 232 of "world series" queries received by search engine 112 between period 1 226 (e.g., this week) and period 2 228 (e.g., last week) exceeds a first particular number (e.g., 2000) and (2) the percentage change in the number 232 of "world series" queries received by search engine 112 between period 1 226 (e.g., this week) and period 2 228 (e.g., last week) exceeds a second particular number (e.g., 200 percent).

Query server 114 sends (512) links corresponding to at least some of the determined queries to a computer associated with the computer user for display, such as the client 102 that the user has used for login. In some instances, only the X highest ranked links are sent, where X is an integer (e.g., a number between 1 and 10) that is either predefined or chosen based on various system features (e.g., the type of client device, or the size of the display or display region in which the response is to be shown) or user preferences.

Client 102 receives (514) links corresponding to at least some of the determined queries from the search engine, and displays (516) at least some of the received links.

Figure 6:
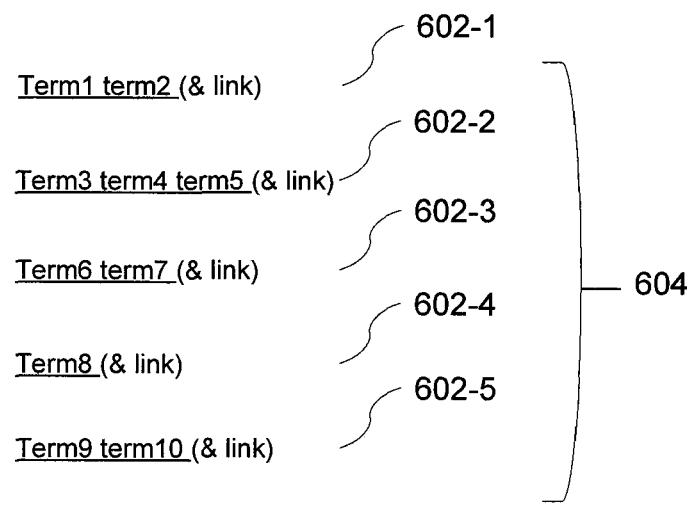
FIG. 6 is a schematic screen shot of an exemplary graphical user interface for displaying personalized recommendations of popular search queries in accordance with one embodiment of the invention.

FIG. 6 is a schematic screen shot of an exemplary graphical user interface for displaying personalized recommendations of popular search queries in accordance with one embodiment of the invention. In some embodiments, GUI 600 includes a plurality 604 of recommended search queries 602 (e.g., as clickable links that include a URL or URI associated with a search engine). The queries 602 may be search queries recommended by a search engine (e.g., query server 114 in search engine 112) for a computer user. As described above, the plurality 604 of queries 602 are determined by search engine 112 based on Internet usage data for the computer user and submission popularity data 218 for search queries submitted by a plurality of users. In some embodiments, clicking on a recommended query 602 initiates the query 602 and search engine 112 provides a corresponding list of search results for the query 602.

In some embodiments, the queries 602 are displayed in a home web page personalized to the user.

The recommended search queries 602 may correspond to recommended search queries of the Internet or just a portion thereof. Recommended search queries of just a portion of the Internet include, without limitation, image search queries, recommended shopping search queries (e.g., Froogle queries), and recommended local search queries (e.g., Google Local queries).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a system having one or more processors that execute one or more programs stored in memory of a search engine executing on a network apparatus:
        obtaining a set of popular search queries;
        receiving Internet usage data for an individual computer user, the Internet usage data including information regarding a plurality of queries previously submitted by the individual computer user, the plurality of queries including a first query submitted by the individual computer user, the plurality of queries being searches for search terms in at least one of an Internet and an Intranet;
        receiving a second query submitted by the individual computer user later in time than the first query, the second query being a request for search results related to the first query, the second query being for a keyword search in at least one of the Internet and the Intranet;
        performing the keyword search in at least one of the Internet and the Intranet based on the second query;
        determining a time difference between when the first query and the second query was submitted by the individual computer user;
        determining a subset of personalized recommendations of popular search queries based on the second query and the Internet usage data for the individual computer user from among the set of popular search queries, the subset of personalized recommendations:
            (i) excluding the first query based on determining that the time difference is within a predefined time range between a point of time in the past and the time the second query was received, and
            (ii) including the first query based on determining that the time difference is earlier than the predefined time range and the first query is in the subset of personalized recommendations;
        sending search results based on the second query to a computer associated with the individual computer user for display, the search results being ordered based on the Internet usage data for the individual computer user; and
        sending links corresponding to the subset of personalized recommendations to the computer associated with the individual computer user for display, the links being ordered based on the Internet usage data for the individual computer user.

2. The method of claim 1, wherein the predefined time range is at least one week.

3. The method of claim 1, where the Internet usage data include search results activated by the individual computer user.

4. The method of claim 1, where the Internet usage data include web pages selected by the individual computer user.

5. The method of claim 4, wherein the web pages selected by the individual computer user correspond to search results selected by the individual computer user.

6. The method of claim 4, wherein the subset of personalized recommendations includes a search query associated with a plurality of web sites containing web pages in the individual computer user's Internet usage data.

7. A method, comprising:
at a system having one or more processors that execute one or more programs stored in memory of a search engine:
obtaining a set of popular search queries including one or more categories associated with a respective query;
receiving Internet usage data for an individual computer user, the Internet usage data including one or more categories of interest to the user;
receiving a submitted query as submitted by the individual computer user, the submitted query being a request for search results from at least one of an Internet and an Intranet and is related to one of the set of popular search queries;
performing a search in at least one of the Internet and the Intranet based on the submitted query;
determining, from the set of popular search queries, a set of personalized popular search queries based on the Internet usage data for the individual computer user and the submitted query, wherein
the determining of the set of personalized popular search queries includes selecting, from the set of popular search queries, a set of personalized popular search queries, based on the one or more categories of interest to the individual computer user,
the determining of the set of personalized popular search queries excludes respective queries of the set of popular search queries in the individual computer user's Internet usage data if the respective queries of the set of popular search queries were selected by the individual computer user within a predefined time range between a point of time in the past and the time the submitted query was received;
sending search results based on the submitted query to a computer associated with the individual computer user for display, the search results being ordered based on the Internet usage data for the individual computer user, the search results being ordered based on the Internet usage data for the individual computer user; and
sending links corresponding to the personalized popular search queries to the computer associated with the individual computer user for display, the links being ordered based on the Internet usage data for the individual computer user.

8. The method of claim 7, wherein the categories of interest to the user are weighted.

9. The method of claim 8, wherein weights of categories are determined based on the individual computer user's query events, result click events, or browsing events in the Internet usage data for the individual computer user.

10. The method of claim 8, wherein weights of categories are used to select the set of personalized popular search queries.

11. The method of claim 8, wherein weights of categories are used to order the set of personalized popular search queries.

12. The method of claim 7, wherein the set of personalized popular search queries includes at least one query associated with a plurality of categories of interest to the user.

13. The method of claim 7, further comprising, for each respective distinct query in the set of popular search queries, associating the respective distinct query with one or more categories.

14. The method of claim 13, wherein the one or more categories for the respective distinct query are associated with web pages that are selected by one or more of a plurality of users from among search results produced in response the distinct query.

15. A method, comprising:
at a system having one or more processors that execute one or more programs stored in memory of a search engine:
receiving a plurality of search queries collectively submitted by a plurality of users, for each respective distinct query in the plurality of search queries:
determining submission popularity data for the respective distinct query, and
associating the respective distinct query with one or more web sites containing web pages that are selected by one or more of the plurality of users in response to the respective distinct query, and
receiving Internet usage data for an individual computer user, wherein the Internet usage data for the individual computer user includes web pages selected by the individual computer user;
receiving a submitted query as submitted by the individual computer user later in time than a time at which the web pages were selected by the individual computer user, the submitted query being a request for search results from at least one of an Internet and an Intranet and is related to one of the plurality of search queries;
performing a search in at least one of the Internet and the Intranet based on the submitted query;
determining one or more personalized recommendations of popular search queries from among the plurality of search queries based on the submitted query, wherein
(a) a respective determined personalized popular search query excludes queries associated with a plurality of web sites containing web pages in the individual computer user's Internet usage data if the web pages in the individual computer user's Internet usage data were selected by the individual computer user within a predefined time range between a point of time in the past and the time the submitted query was received, and
(b) a respective determined personalized popular search query excludes respective queries of the plurality of search queries associated with the individual computer user's Internet usage data that include a change in a number of times the respective query is received within a predefined time period between a point of time in the past and the time the submitted query was received exceeds a predefined value; and
sending search results based on the submitted query to a computer associated with the individual computer user for display, the search results being ordered based on the Internet usage data for the individual computer user; and sending links corresponding to the determined personalized recommendations of popular search queries to the computer associated with the individual computer user for display, the links being ordered based on the Internet usage data for the individual computer user.

16. The method of claim 15, wherein the submission popularity data include a number of times the respective distinct query was received in a predefined time period.

17. The method of claim 15, wherein the submission popularity data include a change in a number of times the respective distinct query was received within the predefined time period.

18. The method of claim 15, wherein the submission popularity data include a percentage change in a number of times the distinct query was received within the predefined time period.

* * * * *